US012212034B2

(12) United States Patent
Lu et al.

(10) Patent No.: US 12,212,034 B2
(45) Date of Patent: Jan. 28, 2025

(54) WAVEGUIDE CONVERSION DEVICE AND WIRELESS COMMUNICATION SYSTEM

(71) Applicants: Beijing BOE Sensor Technology Co., Ltd., Beijing (CN); BOE Technology Group Co., Ltd., Beijing (CN)

(72) Inventors: Yan Lu, Beijing (CN); Haocheng Jia, Beijing (CN); Yi Ding, Beijing (CN); Hao Guo, Beijing (CN); Weisi Zhou, Beijing (CN); Wenxue Ma, Beijing (CN); Jing Wang, Beijing (CN); Xiaobo Wang, Beijing (CN); Chuncheng Che, Beijing (CN)

(73) Assignees: BEIJING BOE SENSOR TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/014,797

(22) PCT Filed: Feb. 28, 2022

(86) PCT No.: PCT/CN2022/078473

§ 371 (c)(1),
(2) Date: Jan. 6, 2023

(87) PCT Pub. No.: WO2023/159636

PCT Pub. Date: Aug. 31, 2023

(65) Prior Publication Data

US 2024/0243459 A1 Jul. 18, 2024

(51) Int. Cl.
*H01P 5/107* (2006.01)
*H01Q 13/08* (2006.01)

(52) U.S. Cl.
CPC ............. *H01P 5/107* (2013.01); *H01Q 13/08* (2013.01)

(58) Field of Classification Search
None
See application file for complete search history.

(56) References Cited

U.S. PATENT DOCUMENTS

2012/0188030 A1* 7/2012 Liu ......................... H01P 5/107
333/238

FOREIGN PATENT DOCUMENTS

| | | | |
|---|---|---|---|
| CN | 206864596 | U | 1/2018 |
| CN | 112615637 | A | 4/2021 |
| JP | 2009033526 | A | 2/2009 |

OTHER PUBLICATIONS

Kumar, et al.; "Broadband Rectangular Waveguide to Suspended Stripline Transition Using Dendritic Structure"; IEEE Microwave and Wireless Components Letters, vol. 26, No. 11, Nov. 2016.

(Continued)

*Primary Examiner* — David E Lotter
(74) *Attorney, Agent, or Firm* — Nath, Goldberg & Meyer; Joshua B. Goldberg

(57) ABSTRACT

The present disclosure provides a waveguide conversion device and wireless communication system. The waveguide conversion device includes: a waveguide cavity including a waveguide transmission cavity and a waveguide back cavity facing each other; a base substrate between the waveguide transmission cavity and the waveguide back cavity, the base substrate including at least a first substrate; and a conversion module on the first substrate and including a balanced antenna, a first differential strip-line and a second differential strip-line, wherein the balanced antenna is in a region where the waveguide transmission cavity faces the waveguide back cavity, the balanced antenna includes a first output port and a second output port; a first end of the first differential strip-line is connected to the first output port of the balanced antenna, and a first end of the second differential strip-line is connected to the second output port of the balanced antenna.

17 Claims, 5 Drawing Sheets

(56) References Cited

OTHER PUBLICATIONS

Yang, et al.; "A Compact and Broadband Differential Microstrip Line to Rectangular Waveguide Transition Using Dipole Antenna"; School of Electronic Engineering, University of Electronic Science and Technology of China, No. 2006, Xiyuan Ave., West Hi-Tech Zone, Chengdu 611731, China.

* cited by examiner

WAVEGUIDE CONVERSION DEVICE AND WIRELESS COMMUNICATION SYSTEM

This is a National Phase Application filed under 35 U.S.C. 371 as a national stage of PCT/CN2022/078473, filed Feb. 28, 2022, the content of each of which is hereby incorporated by reference in its entirety.

TECHNICAL FIELD

The present disclosure relates to the technical field of microwaves, and in particular to a waveguide conversion device and a wireless communication system.

BACKGROUND

The wireless communication system is gradually developing towards miniaturization, integration and multi-function. A waveguide-differential microstrip-line conversion devices becomes an important component of various wireless communication systems, and the performance of the waveguide-differential microstrip-line conversion device directly affects the performance of the wireless communication system. For example, the waveguide-differential microstrip-line conversion device affects the integration of the low profile planar circuits and the anti-interference capability of the wireless communication system.

SUMMARY

The present disclosure aims to provide a waveguide conversion device and a wireless communication system.

As a first aspect, the present disclosure provides a waveguide conversion device, including: a waveguide cavity including a waveguide transmission cavity and a waveguide back cavity facing each other; a base substrate between the waveguide transmission cavity and the waveguide back cavity, the base substrate including at least a first substrate; and a conversion module on the first substrate and including a balanced antenna, a first differential strip-line and a second differential strip-line, wherein the balanced antenna is in a region where the waveguide transmission cavity faces the waveguide back cavity, the balanced antenna includes a first output port and a second output port; a first end of the first differential strip-line is connected to the first output port of the balanced antenna, and a first end of the second differential strip-line is connected to the second output port of the balanced antenna.

The balanced antenna includes a first antenna portion and a second antenna portion symmetrical to each other, the first antenna portion is connected to the second antenna portion via an antenna connection portion. The first output port is disposed on the first antenna portion, and the second output port is disposed on the second antenna portion.

Each of orthographic projections of the first antenna portion and the second antenna portion on the first substrate has a right triangle shape, and an acute angle portion of the first antenna portion is connected to an acute angle portion of the second antenna portion via the antenna connection portion; or each of orthographic projections of the first antenna portion and the second antenna portion on the first substrate has an isosceles triangle shape or equilateral triangle shape, and a vertex angle portion of the first antenna portion is connected to a vertex angle portion of the second antenna portion via the antenna connection portion; or each of orthographic projections of the first antenna portion and the second antenna portion on the first substrate has a rectangular shape, and a short side of the first antenna portion is connected to a short side of the second antenna portion via the antenna connection portion.

The conversion module further includes a balanced branch connected to the antenna connection portion and located between the first and second differential strip-lines.

The base substrate further includes a second substrate disposed on the first substrate and located on a side of the first substrate proximal to the waveguide back cavity, and the conversion module is between the first substrate and the second substrate.

The balanced antenna includes a monopole antenna or a dipole antenna.

The waveguide conversion device further includes a ground plate disposed below a surface of the second substrate proximal to the waveguide back cavity, disposed above a surface of the first substrate proximal to the waveguide transmission cavity, or disposed between the first substrate and the second substrate.

A second end of the first differential strip-line is connected to a first microstrip differential line, and a second end of the second differential strip-line is connected to a second microstrip differential line.

A waveguide ridge is disposed on a bottom of the waveguide back cavity.

One ridge structure or a plurality of ridge structures stacked in sequence are disposed in the waveguide transmission cavity.

The waveguide cavity includes any one of a rectangular waveguide cavity, a circular waveguide cavity, an elliptical waveguide cavity, and a ridge waveguide cavity.

As a second aspect of the present disclosure, a wireless communication system is provided. The wireless communication system includes a waveguide conversion device in any one of the embodiments of the present disclosure.

Figure 1:
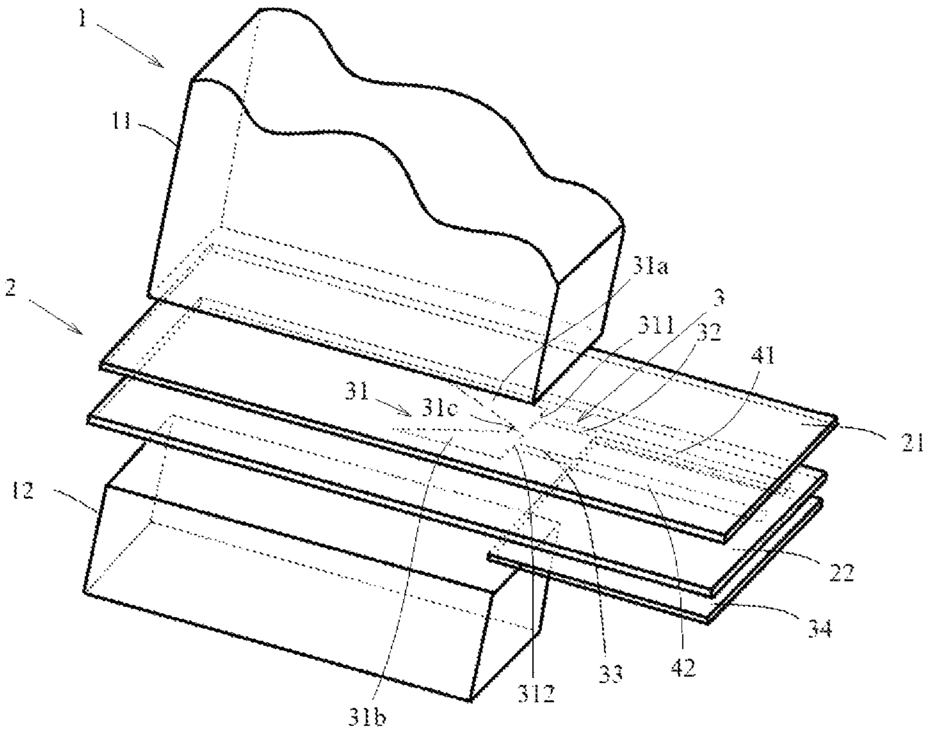
FIG. 1 is a schematic diagram showing a structure of a waveguide conversion device according to an embodiment of the present disclosure.

Wherein the reference characters are:

- 1—Waveguide cavity, 11—waveguide transmission cavity, 111—ridge structure, 12—waveguide back cavity, 121—waveguide ridge;
- 2—Base substrate, 21—first substrate, 22—second substrate;
- 3—Conversion module, 31—balanced antenna, 31*a*—first antenna portion, 31*b*—second antenna portion, 31*c*—antenna connection portion. 311—first output port, 312—second output port, 32—first differential strip-line, 33—second differential strip-line, 34—ground plate, 35—balanced branch; and
- 41—First microstrip differential line, 42—second microstrip differential line.

DETAIL DESCRIPTION OF EMBODIMENTS

For those skilled in the art to better understand the technical solutions of the present disclosure/utility model, the following detailed description is provided with reference to the accompanying drawings and the specific embodiments.

Unless defined otherwise, technical or scientific terms used herein shall have the ordinary meaning as understood by one of ordinary skill in the art to which this disclosure belongs. The use of “first,” “second,” and the like in this disclosure is not intended to indicate any order, quantity, or importance, but rather is used to distinguish one element from another. Also, the use of the terms “a,” “an.” or “the” and similar referents do not denote a limitation of quantity, but rather denote the presence of at least one. The word “include” or “comprise”, and the like, means that the element or item preceding the word comprises the element or item listed after the word and its equivalent, but does not exclude other elements or items. The terms “connect” or “couple” and the like are not restricted to physical or mechanical connections, but may include electrical connections, whether direct or indirect. “Upper”, “lower”, “left”, “right”, and the like are used only to indicate relative positional relationships, and when the absolute position of the object being described is changed, the relative positional relationships may also be changed accordingly.

As a first aspect, an embodiment of the present disclosure provides a waveguide conversion device, which can implement the coupling between a waveguide and microstrip differential lines and solve the mismatch problem of the mode conversion.

Figure 2:
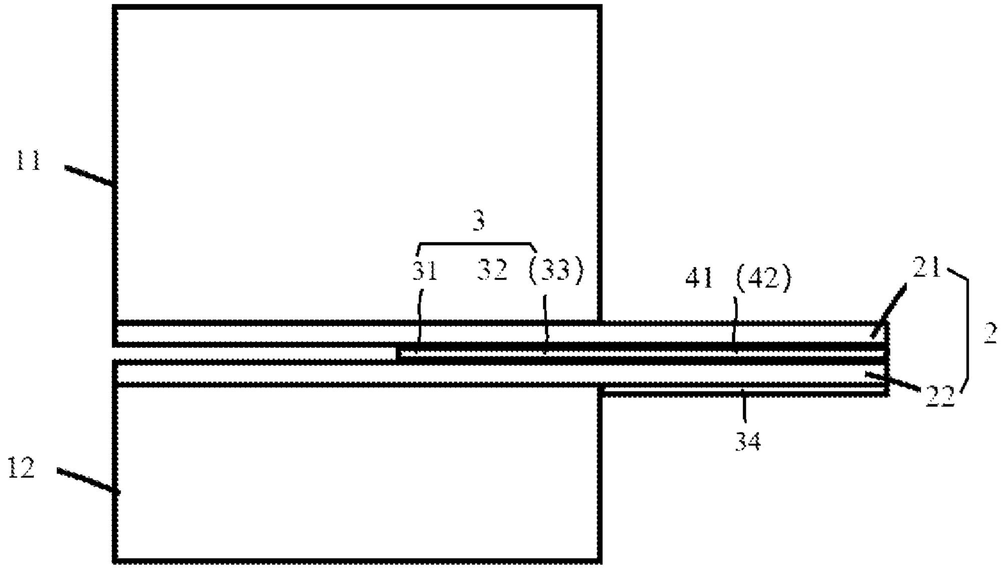
FIG. 2 is a side view of a waveguide conversion device according to an embodiment of the present disclosure.

FIG. 1 is a schematic diagram showing a structure of a waveguide conversion device according to an embodiment of the present disclosure. FIG. 2 is a side view of a waveguide conversion device according to an embodiment of the present disclosure. As shown in FIG. 1 and FIG. 2, the waveguide conversion device includes a waveguide cavity 1, a base substrate 2, and a conversion module 3.

The waveguide cavity 1 may constrain a transmission direction of electromagnetic waves. The waveguide cavity 1 includes a waveguide transmission cavity 11 and a waveguide back cavity 12 facing each other, and a region where the waveguide transmission cavity 11 faces the waveguide back cavity 12 is a feed port.

In some embodiments, the waveguide cavity 1 is a rectangular waveguide cavity, that is, both of the waveguide transmission cavity 11 and the waveguide back cavity 12 have rectangular structures. The rectangular waveguide cavity has a wide bandwidth of a fundamental mode, thereby realizing the mode matching in a wide frequency band.

In some embodiments, a height of the waveguide back cavity 12 is a quarter of the wavelength of the waveguide, that is, the height of the waveguide back cavity 12 is λ/4, where λ is the wavelength of the waveguide, thereby increasing the coupling efficiency of the waveguide, increasing the transmission efficiency of the waveguide, and improving the resonant frequency and the bandwidth.

In the embodiment, the base substrate 2 is disposed between the waveguide transmission cavity 11 and the waveguide back cavity 12, that is, the waveguide transmission cavity 11, the base substrate 2, and the waveguide back cavity 12 are stacked in sequence.

In some embodiments, the base substrate 2 includes at least a first substrate 21. Both of the waveguide transmission cavity 11 and the first substrate 21 may constrain the electromagnetic waves to the conversion module 3, thereby improving the coupling efficiency of the waveguide.

In the embodiment, the conversion module 3 is disposed on the first substrate 21, that is, the conversion module 3 is carried on the first substrate 21. The conversion from the mode of the waveguide to the mode of the microstrip differential lines can be realized by the conversion module 3.

In some embodiments, the conversion module 3 includes a balanced antenna 31, a first differential strip-line 32, and a second differential strip-line 33. The balanced antenna 31 is disposed in a region where the waveguide transmission cavity 11 faces the waveguide back cavity 12, that is, the balanced antenna 31 is disposed in a region corresponding to the feed port. The balanced antenna 31 includes a first output port 311 and a second output port 312 for outputting differential signals. A first end of the first differential strip-line 32 is connected to the first output port 311 of the balanced antenna 31, and a first end of the second differential strip-line 33 is connected to the second output port 312 of the balanced antenna 31.

In some embodiments, a second end of the first differential strip-line 32 is connected to a first microstrip differential line 41, that is, the first output port 311 of the balanced antenna 31 is connected to the first microstrip differential line 41 via the first differential strip-line 32. A second end of the second differential strip-line 33 is connected to a second microstrip differential line 42, that is, the second output port 312 of the balanced antenna 31 is connected to the second microstrip differential line 42 via the second differential strip-line 33.

It should be noted that the first end and the second end of the first differential strip-line 32 do not define the positions of both ends of the first differential strip-line 32, and the first end and the second end of the second differential strip-line 33 do not define the positions of both ends of the second differential strip-line 33.

Figure 3:
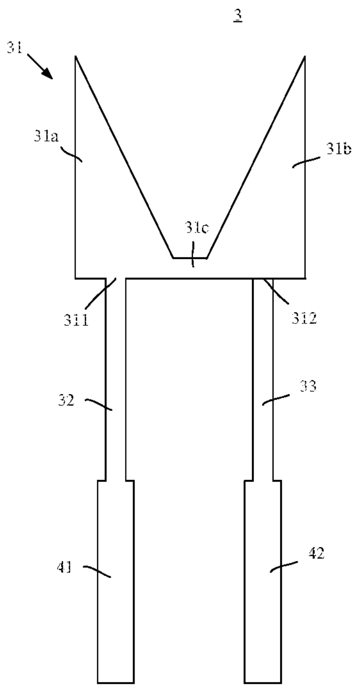
FIG. 3 is a schematic diagram showing a structure of a conversion module and microstrip differential lines according to an embodiment of the present disclosure.

FIG. 3 is a schematic diagram showing a structure of a conversion module and microstrip differential lines according to an embodiment of the present disclosure. As shown in FIG. 1 and FIG. 3, the balanced antenna 31 includes a first antenna portion 31*a* and a second antenna portion 31*b* which are symmetrical to each other. The first antenna portion 31*a* and the second antenna portion 31*b* are connected to each other via an antenna connection portion 31*c*. A first output port 311 is disposed on the first antenna portion 31*a*, and a second output port 312 is disposed on the second antenna portion 31*b*.

In some embodiments, each of orthographic projections of the first antenna portion 31*a* and the second antenna portion 31*b* on the first substrate 21 has a right triangle shape, and an acute angle portion of the first antenna portion

31*a* is connected to an acute angle portion of the second antenna portion 31*b* via the antenna connection portion 31*c*.

It should be noted that the right triangle has two acute angles, and degrees of the two acute angles may be the same as each other or different from each other. Correspondingly, each of the first antenna portion 31*a* and the second antenna portion 31*b* has two acute angle portions, and the degrees of the two acute angle portions may be the same as or different from each other.

For example, the first antenna portion 31*a* includes a first acute angle portion and a second acute angle portion, and the degree of the first acute angle portion may be greater than or equal to the degree of the second acute angle portion. The second antenna portion 31*b* includes a first acute angle portion and a second acute angle portion, and the degree of the first acute angle portion is greater than or equal to the degree of the second acute angle portion. The degree of the first acute angle portion of the first antenna portion 31*a* is the same as the degree of the first acute angle portion of the second antenna portion 31*b*, and the degree of the second acute angle portion of the first antenna portion 31*a* is the same as the degree of the second acute angle portion of the second antenna portion 31*b*, thereby ensuring that the first antenna portion 31*a* and the second antenna portion 31*b* are symmetrical to each other.

It is to be understood that the first acute angle portion and the second acute angle portion are only for convenience of explanation of the first antenna portion 31*a* and the second antenna portion 31*b* each having the two acute angle portions, but do not limit the positions of the first acute angle portion and the second acute angle portion.

When the degrees of the first acute angle portion and the second acute angle portion are different from each other, the first antenna portion 31*a* and the second antenna portion 31*b* should be symmetrical and connected to each other, that is, the first acute angle portion of the first antenna portion 31*a* is connected to the first acute angle portion of the second antenna portion 31*b* via the antenna connection portion 31*c*, or the second acute angle portion of the first antenna portion 31*a* is connected to the second acute angle portion of the second antenna portion 31*b* via the antenna connection portion 31*c*; or the right angle portion of the first antenna portion 31*a* is connected to the right angle portion of the second antenna portion 31*b* via the antenna connection portion 31*c*.

In the embodiment of the present disclosure, the balanced antenna 31 is a planar antenna and formed by connecting the first antenna portion 31*a* to the second antenna portion 31*b* that are symmetrical to each other. In order to couple the fundamental mode of the waveguide tightly, the direction of insertion of the balanced antenna 31 into the waveguide cavity 1 may be adjusted according to the characteristics of the distribution of the magnetic fields of the waveguide and the balanced antenna 31.

For example, when the waveguide cavity 1 is a rectangular waveguide cavity, the balanced antenna 31 is inserted into the rectangular waveguide cavity 1 from a narrow side of the rectangular waveguide cavity, so that an electric field generated by the balanced antenna 31 coincides in mode with an electric field of the fundamental mode of the waveguide, thereby exciting the fundamental mode of the waveguide.

It should be noted that an input impedance of the balanced antenna 31 is a function of the width and the length of the balanced antenna 31, the height of the waveguide back cavity 12, and the frequency. The effect of the frequency on the input impedance of the balanced antenna 31 can be reduced by adjusting the length and width of the balanced antenna 31 and the height of the waveguide back cavity 12, that is, both a real part and an imaginary part of the input impedance are not affected by the frequency. By adjusting the length and the width of the balanced antenna 31, the impedance of the balanced antenna 31 has a real part of 50 ohms and an imaginary part, so that the balanced antenna 31 is matched in mode to the first microstrip differential line 41 and the second microstrip differential line 42.

In the embodiment of the present disclosure, the waveguide is coupled to the first differential strip-line 32 and the second differential strip-line 33 via the balanced antenna 31, and the mode matching between the balanced antenna 31 and the first microstrip differential line 41 and the second microstrip differential line 42 can be achieved.

As shown in FIG. 1 and FIG. 2, the base substrate 2 further includes a second substrate 22 disposed on the first substrate 21. The second substrate 22 is located on a side of the first substrate 21 proximal to the waveguide back cavity 12, and the conversion module 3 is disposed between the first substrate 21 and the second substrate 22. That is, the waveguide transmission cavity 11, the first substrate 21, the conversion module 3, the second substrate 22 and the waveguide back cavity 12 are stacked in sequence.

The conversion module 3 is disposed between the first substrate 21 and the second substrate 22. Both of the first substrate 21 and the waveguide transmission cavity 11 may constrain the transmission of the electromagnetic waves to the balanced antenna 31. Both of the second substrate 22 and the waveguide back cavity 12 may reduce the loss of the electromagnetic waves.

In some embodiments, the balanced antenna 31 is a monopole antenna or a half-wave dipole antenna. The monopole antenna and the half-wave dipole antenna have a flexible design, a wide application range, and a suitability for various types of waveguides.

When the balanced antenna 31 is a monopole antenna, the waveguide conversion device 3 further includes a ground plate 34 which is grounded as shown in FIG. 1 and FIG. 2. The ground plate 34 is disposed on a side of the second substrate 22 proximal to the waveguide back cavity 12, or the ground plate 34 is disposed on a side of the first substrate 21 proximal to the waveguide transmission cavity 11, or the ground plate 34 is disposed between the first substrate 21 and the second substrate 22.

In some embodiments, the ground plate 34 has the same width as the first and second substrates 21, 22, and the ground plate 34 has a length less than the lengths of the first and second substrates 21, 22. The ground plate 34 is disposed outside the waveguide back cavity 12, that is, the ground plate 34 is not inserted between the waveguide transmission cavity 11 and the waveguide back cavity 12. In some embodiments, the ground plate 34 is partially inserted between the waveguide transmission cavity 11 and the waveguide back cavity 12, that is, a portion of the ground plate 34 is inserted between the waveguide transmission cavity 11 and the waveguide back cavity 12, without affecting the waveguide transmission.

Figure 4:
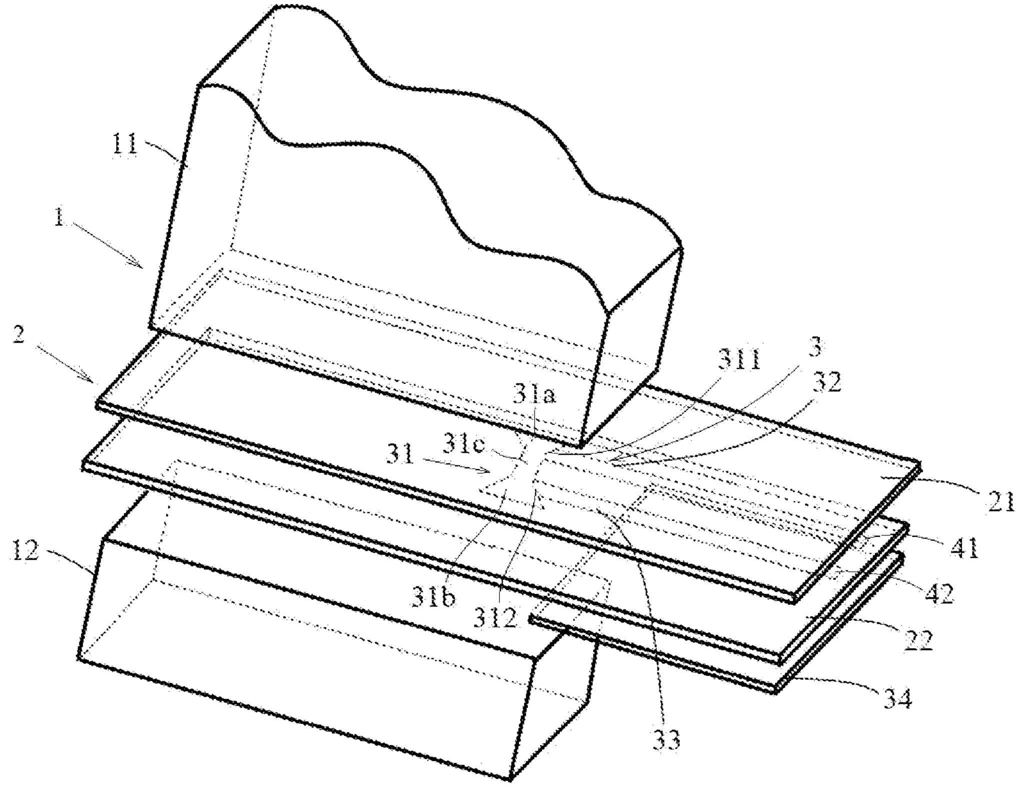
FIG. 4 is a schematic diagram showing a structure of another waveguide conversion device according to an embodiment of the present disclosure.

FIG. 4 is a schematic diagram showing structure of another waveguide conversion device according to an embodiment of the present disclosure. As shown in FIG. 4, the waveguide conversion device includes a waveguide cavity 1, a base substrate 2, and a conversion module 3. The waveguide cavity 1 and the base substrate 2 in the waveguide conversion device shown FIG. 4 are the same as those shown in FIG. 1, and the conversion module 3 in the waveguide conversion device shown in FIG. 4 is different from that shown in FIG. 1. Only different components will be described below for simplicity.

The conversion module 3 includes a balanced antenna 31, a first differential strip-line 32, and a second differential strip-line 33. The balanced antenna 31 is disposed in a region where the waveguide transmission cavity 11 overlaps the waveguide back cavity 12. That is, the balanced antenna 31 is disposed in a region corresponding to the feed port. The balanced antenna 31 includes a first output port 311 and a second output port 312 for outputting differential signals. One end of the first differential strip-line 32 is connected to the first output port 311 of the balanced antenna 31, and the other end of the first differential strip-line 32 is connected to the first microstrip differential line 41, that is, the first output port 311 of the balanced antenna 31 is connected to the first microstrip differential line 41 via the first differential strip-line 32. One end of the second differential strip-line 33 is connected to the second output port 312 of the balanced antenna 31, and the other end of the second differential strip-line 33 is connected to the second microstrip differential line 42, that is, the second output port 312 of the balanced antenna 31 is connected to the second microstrip differential line 42 via the second differential strip-line 33.

In the embodiment of the present disclosure, the balanced antenna 31 includes a first antenna portion 31*a* and a second antenna portion 31*b* which are symmetrical to each other. The first antenna portion 31*a* and the second antenna portion 31*b* are connected to each other via an antenna connection portion 31*c*. The first output port 311 is disposed on the first antenna portion 31*a*, and the second output port 312 is disposed on the second antenna portion 31*b*.

In some embodiments, each of the orthographic projections of the first antenna portion 31*a* and the second antenna portion 31*b* on the first substrate 21 has an isosceles triangle shape or an equilateral triangle shape. A vertex angle portion of the first antenna portion 31*a* is connected to a vertex angle portion of the second antenna portion 31*b* via the antenna connection portion 31*c*. The vertex angle portion refers to a vertex angle of the triangle. For the first antenna portion 31*a* and the second antenna portion 31*b* both having the orthographic projections of the isosceles triangles, the vertex angle portion refers to the vertex angle of the isosceles triangle. For the first antenna portion 31*a* and the second antenna portion 31*b* both having the orthographic projections of the equilateral triangles, the vertex angle portion refers to any one of the vertex angles of the equilateral triangle.

As shown in FIG. 4, after the vertex angle of the first antenna portion 31*a* is connected to the vertex angle of the second antenna portion 31*b* via the antenna connection portion 31*c*, the orthographic projection of the balanced antenna 31 on the first substrate 21 has a bow-tie shape.

Figure 5:
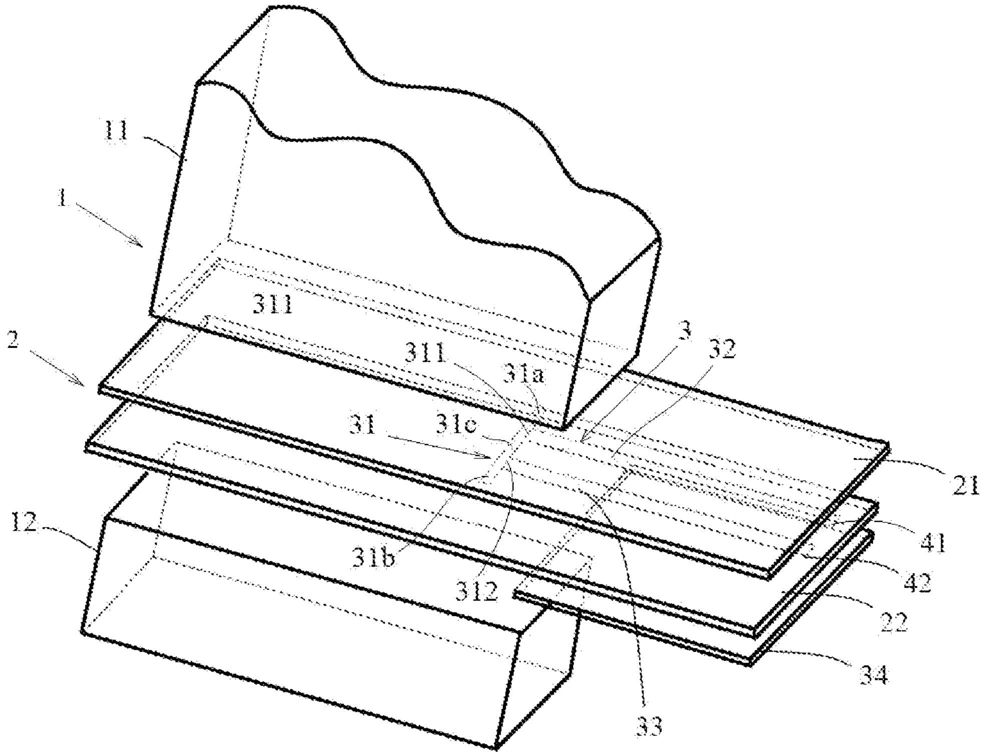
FIG. 5 is a schematic diagram showing a structure of another waveguide conversion device according to an embodiment of the present disclosure.

FIG. 5 is a schematic diagram showing a structure of another waveguide conversion device according to an embodiment of the present disclosure. As shown in FIG. 5, the waveguide conversion device includes a waveguide cavity 1, a base substrate 2, and a conversion module 3. The waveguide cavity 1 and the substrate 2 are different from those in the waveguide conversion device shown in FIG. 1 and FIG. 4, and the conversion module 3 is different from that in the waveguide conversion device shown in FIG. 1 and FIG. 4. Only different components will be described below for simplicity.

The conversion module 3 includes a balanced antenna 31, a first differential strip-line 32, and a second differential strip-line 33. The balanced antenna 31 is disposed at a region where the waveguide transmission cavity 11 faces the waveguide back cavity 12, that is, the balanced antenna 31 is disposed in a region corresponding to the feed port. The balanced antenna 31 includes a first output port 311 and a second output port 312 for outputting differential signals. One end of the first differential strip-line 32 is connected to the first output port 311 of the balanced antenna 31, and the other end of the first differential strip-line 32 is connected to the first microstrip differential line 41, that is, the first output port 311 of the balanced antenna 31 is connected to the first microstrip differential line 41 via the first differential strip-line 32. One end of the second differential strip-line 33 is connected to the second output port 312 of the balanced antenna 31, and the other end of the second differential strip-line 33 is connected to the second microstrip differential line 42, that is, the second output port 312 of the balanced antenna 31 is connected to the second microstrip differential line 42 via the second differential strip-line 33.

As shown in FIG. 5, the balanced antenna 31 includes a first antenna portion 31*a* and a second antenna portion 31*b* which are symmetrical to each other. The first antenna portion 31*a* and the second antenna portion 31*b* are connected to each other via an antenna connection portion 31*c*. The first output port 311 is disposed on the first antenna portion 31*a*, and the second output port 312 is disposed on the second antenna portion 31*b*.

In the embodiment, each of orthographic projections of the first antenna portion 31*a* and the second antenna portion 31*b* on the first substrate 21 has a rectangular shape. A short side of the first antenna portion 31*a* is connected to a short side of the second antenna portion 31*b* via the antenna connection portion 31*c*. After the short side of the first antenna portion 31*a* is connected to the short side of the second antenna portion 31*b* via the antenna connection portion 31*c*, the orthographic projection of the balanced antenna 31 on the first substrate 21 has a rectangular shape.

Figure 6:
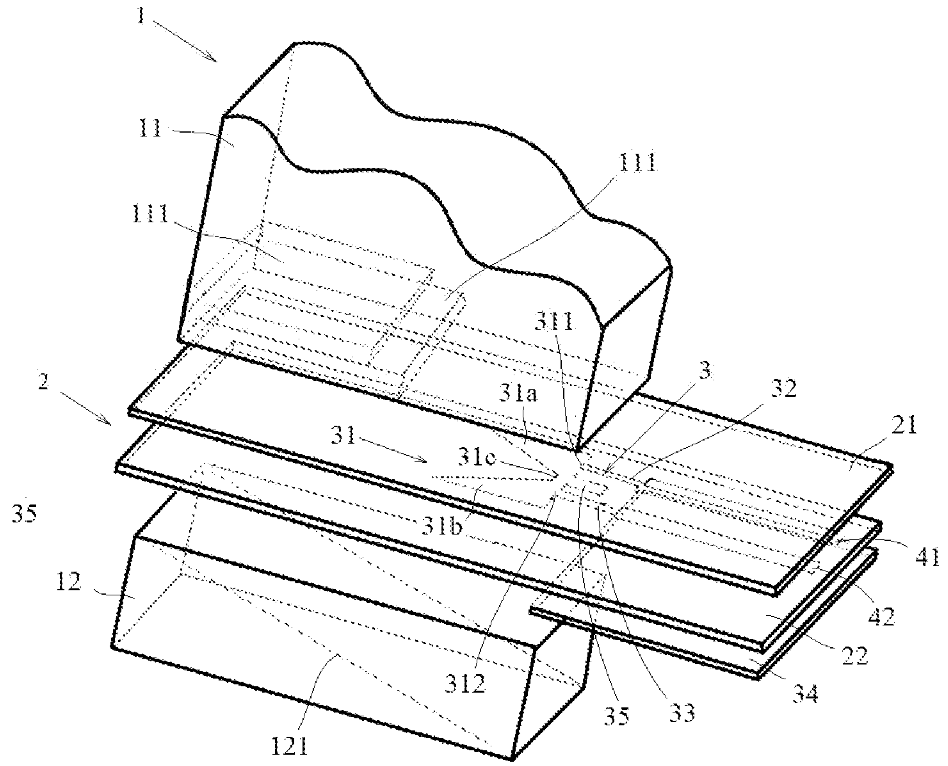
FIG. 6 is a schematic diagram showing a structure of another waveguide conversion device according to an embodiment of the present disclosure.

FIG. 6 is a schematic diagram showing a structure of another waveguide conversion device according to an embodiment of the present disclosure. As shown in FIG. 6, the waveguide conversion device includes a waveguide cavity 1, a base substrate 2, and a conversion module 3.

The waveguide cavity 1 may constrain the transmission direction of the electromagnetic waves. The waveguide cavity 1 includes a waveguide transmission cavity 11 and a waveguide back cavity 12 facing each other, and a region where the waveguide transmission cavity 11 faces the waveguide back cavity 12 is a feed port.

In some embodiments, the waveguide cavity 1 is a rectangular waveguide cavity, that is, both of the waveguide transmission cavity 11 and the waveguide back cavity 12 have rectangular structures. In some embodiments, a height of the waveguide back cavity 12 is a quarter of the wavelength of the waveguide, that is, the height of the waveguide back cavity 12 is $\lambda/4$, where $\lambda$ is the wavelength of the waveguide, thereby increasing the coupling efficiency of the waveguide, increasing the transmission efficiency of the waveguide, and improving the resonant frequency and the bandwidth.

In some embodiments, a waveguide ridge 121 is disposed at the bottom of the waveguide back cavity 12, and the waveguide ridge 121 may improve the distribution state of the magnetic field and reduce the loss of electromagnetic waves. Furthermore, the waveguide ridge 121 may improve the degree of mode matching and expand the bandwidth. The embodiment does not limit the shape and location of the waveguide ridge 121 within the waveguide cavity 12.

In some embodiments, one or more ridge structures 111 stacked in sequence are disposed in the waveguide transmission cavity 11.

An operation mode of the rectangular waveguide cavity is TE10 mode, and an operation mode of the first microstrip differential line 41 and the second microstrip differential line 42 is TEM mode, therefore the impedances of the two modes do not match each other. The ridge structure(s) 111 is arranged in the rectangular waveguide cavity 11 in order to make the characteristic impedance of the waveguide equal to the characteristic impedance of the balanced antenna 31. The height and length of the ridge structure(s) 111 may be set as required. For example, in the embodiment, the height (i.e., the thickness) of the ridge structure 111 may be set to be one quarter of the wavelength of the waveguide, that is, the height of the ridge structure 111 is λ/4, where λ is the wavelength of the waveguide, so as to achieve impedance matching between the two modes. In some embodiments, the heights of the ridge structures may be adjusted through a ripple response method and by compensating for the step capacitance effect of the ridge structures 111.

In the embodiment, the base substrate 2 is disposed between the waveguide transmission cavity 11 and the waveguide back cavity 12, that is, the waveguide transmission cavity 11, the base substrate 2, and the waveguide back cavity 12 are stacked in sequence.

In some embodiments, the base substrate 2 includes at least a first substrate 21. Both of the waveguide transmission cavity 11 and the first substrate 21 may constrain the electromagnetic waves near the conversion module 3 as much as possible, thereby improving the coupling efficiency of the waveguide.

In the embodiment, the conversion module 3 is disposed on the first substrate 21, that is, the conversion module 3 is carried on the first substrate 21. The conversion from the mode of the waveguide to the mode of the microstrip differential lines can be realized by the conversion module 3.

In some embodiments, the conversion module 3 includes a balanced antenna 31, a first differential strip-line 32, and a second differential strip-line 33. The balanced antenna 31 is disposed in a region where the waveguide transmission cavity 11 faces the waveguide back cavity 12, that is, the balanced antenna 31 is disposed in a region corresponding to the feed port. The balanced antenna 31 includes a first output port 311 and a second output port 312 for outputting differential signals. One end of the first differential strip-line 32 is connected to the first output port 311 of the balanced antenna 31, and the other end of the first differential strip-line 32 is connected to the first microstrip differential line 41, that is, the first output port 311 of the balanced antenna 31 is connected to the first microstrip differential line 41 via the first differential strip-line 32. One end of the second differential strip-line 33 is connected to the second output port 312 of the balanced antenna 31, and the other end of the second differential strip-line 33 is connected to the second microstrip differential line 42, that is, the second output port 312 of the balanced antenna 31 is connected to the second microstrip differential line 42 via the second differential strip-line 33.

In some embodiments, the balanced antenna 31 includes a first antenna portion 31*a* and a second antenna portion 31*b* that are symmetrical to each other. The first antenna portion 31*a* is connected to the second antenna portion 31*b* via an antenna connection portion 31*c*. The first output port 311 is disposed on the first antenna portion 31*a*, and the second output port 312 is disposed on the second antenna portion 31*b*.

In some embodiments, each of orthographic projections of the first antenna portion 31*a* and the second antenna portion 31*b* on the first substrate 21 has a right triangle shape. An acute angle portion of the first antenna portion 31*a* is connected to an acute angle portion of the second antenna portion 31*b* via the antenna connection portion 31*c*.

In the embodiment of the present disclosure, the balanced antenna 31 is a planar antenna, and is formed by connecting the first antenna portion 31*a* and the second antenna portion 31*b* that are symmetrical to each other. In order to couple the fundamental mode of the waveguide tightly, the direction of insertion of the balanced antenna 31 into the waveguide cavity 1 may be adjusted according to the characteristics of the distribution of the magnetic fields of the waveguide and the balanced antenna 31.

For example, when the waveguide cavity 1 is a rectangular waveguide cavity, the balanced antenna 31 is inserted into the rectangular waveguide cavity 1 from a narrow side of the rectangular waveguide cavity, so that the electric field generated by the balanced antenna 31 coincides in mode with the electric field of the fundamental mode of the waveguide, thereby exciting the fundamental mode of the waveguide.

In the embodiment of the present disclosure, the waveguide is coupled to the first differential strip-line 32 and the second differential strip-line 33 via the balanced antenna 31, so that the mode matching between the balanced antenna 31 and the first microstrip differential line 41 and the second microstrip differential line 42 can be achieved.

In some embodiments, the conversion module 3 further includes a balanced branch 35 which is connected to the antenna connection portion 31*c* and located between the first differential strip-line 32 and the second differential strip-line 33.

The balanced branch 35 has a portion overlapping the ground plate 34, that is, a portion of the balanced branch 35 is positioned in a region where the waveguide transmission cavity 11 faces the waveguide back cavity 12, and the remaining portion of the balanced branch 35 is outside the region where the waveguide transmission cavity 11 faces the waveguide back cavity 12. According to the odd-even mode theory, when differential-mode signals are used for exciting the balanced antenna 31, the symmetrical planes/portions of the balanced antenna 31 are equivalent to electrical walls, and the first antenna portion 2*a* and the second antenna portion 2*b* are equivalent to that the first antenna portion 2*a* and the second antenna portion 2*b* are short-circuited and grounded. When common-mode signals are used for exciting the balanced antenna 31, the symmetrical planes/portions of the balanced antenna 31 are equivalent to magnetic walls, and the first antenna portion 2*a* and the second antenna portion 2*b* are equivalent to be electrically disconnected from each other or equivalent to that the first antenna portion 2*a* is electrically disconnected from the second antenna portion 2*b* at the antenna connection portion 31*c*, so that the inhibition capability of the balanced antenna 31 on the common-mode signals in a differential-mode passband can be improved, an internal grounding structure of the balanced antenna 31 can be omitted, and the manufacture difficulty can be reduced.

In some embodiments, the base substrate 2 further includes a second substrate 22 stacked on the first substrate 21 and located on a side of the first substrate 21 proximal to the waveguide back cavity 12. The conversion module 3 is disposed between the first substrate 21 and the second substrate 22. That is, the waveguide transmission cavity 11, the first substrate 21, the conversion module 3, the second substrate 22 and the waveguide back cavity 12 are stacked in sequence.

In the embodiment of the present disclosure, the conversion module 3 is disposed between the first substrate 21 and the second substrate 22. Both of the first substrate 21 and the waveguide transmission cavity 11 may constrain the transmission of the electromagnetic waves to the balanced antenna 31, and both of the second substrate 22 and the waveguide back cavity 12 may reduce the loss of the electromagnetic waves.

In some embodiments, the balanced antenna 31 includes a monopole antenna or a dipole antenna. The monopole antenna and the dipole antenna have a flexible design, a wide application range, and a suitability for various kinds of waveguides.

As shown in FIG. 6, when the balanced antenna 31 is a monopole antenna, the waveguide conversion device 3 further includes a ground plate 34 which is grounded or virtually grounded. The ground plate 34 is disposed on a surface of the second substrate 22 proximal to the waveguide back cavity 12. A width of the ground plate 34 is the same as the widths of the first substrate 21 and the second substrate 22, and a length of the ground plate 34 is smaller than the lengths of the first substrate 21 and the second substrate 22. The ground plate 34 is disposed outside the waveguide back cavity 12, that is, the ground plate 34 is not inserted between the waveguide transmission cavity 11 and the waveguide back cavity 12.

Figure 7:
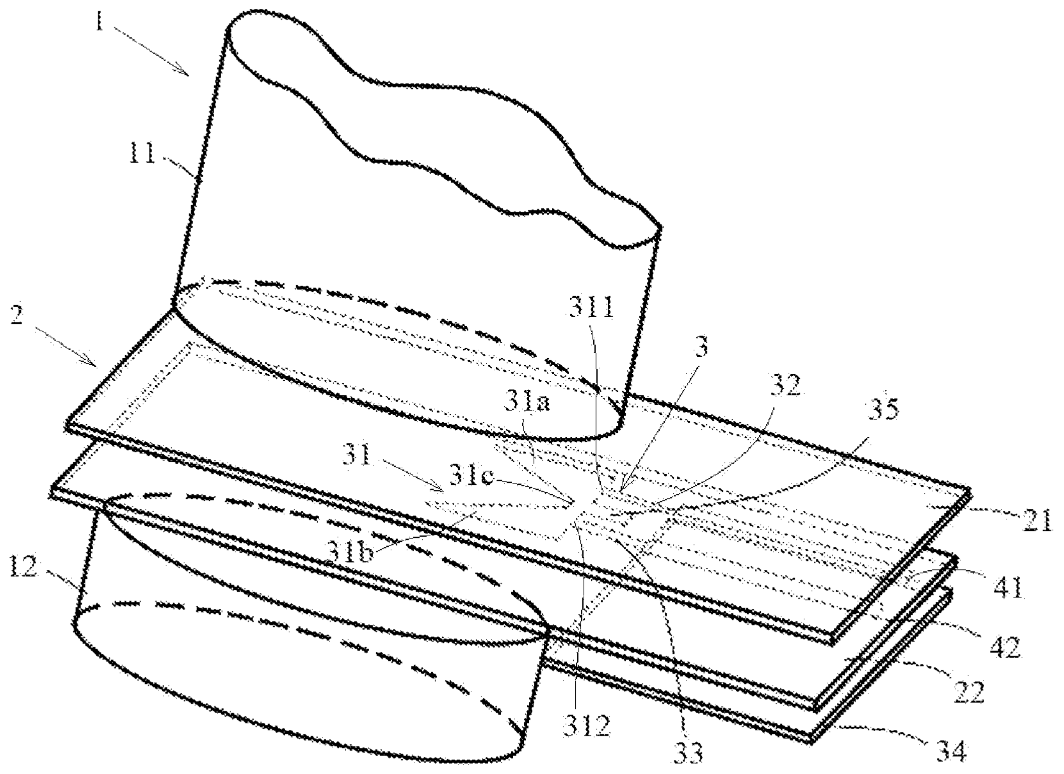
FIG. 7 is a schematic diagram showing a structure of another waveguide conversion device according to an embodiment of the present disclosure.

FIG. 7 is a schematic diagram showing a structure of another waveguide conversion device according to an embodiment of the present disclosure. As shown in FIG. 7, the waveguide conversion device includes a waveguide cavity 1, a base substrate 2, and a conversion module 3.

The waveguide cavity 1 may constrain the transmission direction of the electromagnetic waves. The waveguide cavity 1 includes a waveguide transmission cavity 11 and a waveguide back cavity 12 facing each other, and a region where the waveguide transmission cavity 11 faces the waveguide back cavity 12 is a feed port.

In some embodiments, the waveguide cavity 1 is an elliptical waveguide cavity, that is, both of the waveguide transmission cavity 11 and the waveguide back cavity 12 have elliptical structures. At a same frequency, the elliptical waveguide cavity has lighter weight, which is beneficial to the miniaturization and the light weight of the structures.

In some embodiments, a height of the waveguide back cavity 12 is a quarter of the wavelength of the waveguide, that is, the height of the waveguide back cavity 12 is $\lambda/4$, where $\lambda$ is the wavelength of the waveguide, thereby increasing the coupling efficiency of the waveguide, increasing the transmission efficiency of the waveguide, and improving the resonant frequency and the bandwidth.

It should be noted that, although in the waveguide conversion device shown in FIG. 7, no ridge structure(s) is disposed in the waveguide transmission cavity 11, it does not mean that the ridge structure(s) may not formed in the waveguide transmission cavity 11 of the waveguide conversion device. No ridge structure(s) is disposed in the waveguide back cavity 12, but it does not mean that the ridge structure(s) may not formed in the waveguide back cavity 12 of the waveguide conversion device.

In the embodiment, the base substrate 2 is disposed between the waveguide transmission cavity 11 and the waveguide back cavity 12, that is, the waveguide transmission cavity 11, the base substrate 2, and the waveguide back cavity 12 are stacked in sequence.

In some embodiments, the base substrate 2 includes at least a first substrate 21. Both of the waveguide transmission cavity 11 and the first substrate 21 may constrain the electromagnetic waves near the conversion module 3 as much as possible, thereby improving the coupling efficiency of the waveguide.

In the embodiment, the conversion module 3 is disposed on the first substrate 21, that is, the conversion module 3 is carried on the first substrate 21. The conversion from the mode of the waveguide to the mode of the microstrip differential lines can be realized by the conversion module 3.

In some embodiments, the conversion module 3 includes a balanced antenna 31, a first differential strip-line 32, and a second differential strip-line 33. The balanced antenna 31 is disposed in a region where the waveguide transmission cavity 11 is opposite to or faces the waveguide back cavity 12, that is, the balanced antenna 31 is disposed in a region corresponding to the feed port. The balanced antenna 31 includes a first output port 311 and a second output port 312 for outputting differential signals. One end of the first differential strip-line 32 is connected to the first output port 311 of the balanced antenna 31, and the other end of the first differential strip-line 32 is connected to the first microstrip differential line 41, that is, the first output port 311 of the balanced antenna 31 is connected to the first microstrip differential line 41 via the first differential strip-line 32. One end of the second differential strip-line 33 is connected to the second output port 312 of the balanced antenna 31, and the other end of the second differential strip-line 33 is connected to the second microstrip differential line 42. That is, the second output port 312 of the balanced antenna 31 is connected to the second microstrip differential line 42 via the second differential strip-line 33.

In some embodiments, the balanced antenna 31 includes a first antenna portion 31*a* and a second antenna portion 31*b* symmetrical to each other, and the first antenna portion 31*a* is connected to the second antenna portion 31*b* via an antenna connection portion 31*c*. The first output port 311 is disposed on the first antenna portion 31*a*, and the second output port 312 is disposed on the second antenna portion 31*b*.

In some embodiments, each of orthographic projections of the first antenna portion 31*a* and the second antenna portion 31*b* on the first substrate 21 has a right triangle shape, and an acute angle portion of the first antenna portion 31*a* is connected to an acute angle portion of the second antenna portion 31*b* via the antenna connection portion 31*c*.

In the embodiment of the present disclosure, the balanced antenna 31 is a planar antenna, and is formed by connecting the first antenna portion 31*a* and the second antenna portion 31*b* that are symmetrical to each other. In order to couple the fundamental mode of the waveguide tightly, the direction of insertion of the balanced antenna 31 into the waveguide cavity 1 may be adjusted according to the characteristics of the distribution of the magnetic fields of the waveguide and the balanced antenna 31.

For example, when the waveguide cavity 1 is a rectangular waveguide cavity, the balanced antenna 31 is inserted into the rectangular waveguide cavity 1 from a narrow side of the rectangular waveguide cavity, so that the electric field generated by the balanced antenna 31 coincides in mode with the electric field of the fundamental mode of the waveguide, thereby exciting the fundamental mode of the waveguide.

In the embodiment of the present disclosure, the waveguide is coupled to the first differential strip-line 32 and the second differential strip-line 33 via the balanced antenna 31, so that the mode matching between the balanced antenna 31 and the first microstrip differential line 41 and the second microstrip differential line 42 can be achieved.

In some embodiments, the conversion module 3 further includes a balanced branch 35 which is connected to the antenna connection portion 31*c* and located between the first differential strip-line 32 and the second differential strip-line 33.

The balanced branch 35 has a portion overlapping the ground plate 34, that is, a portion of the balanced branch 35 is located in a region where the waveguide transmission cavity 11 faces the waveguide back cavity 12, and the remaining portion of the balanced branch 35 is outside the region where the waveguide transmission cavity 11 faces the waveguide back cavity 12. According to the odd-even mode theory, when differential-mode signals are used for exciting the balanced antenna 31, the symmetrical planes/portions of the balanced antenna 31 are equivalent to the electrical walls, and the first antenna portion 2*a* and the second antenna portion 2*b* are equivalent to that the first antenna portion 2*a* and the second antenna portion 2*b* are short-circuited and grounded. When common-mode signals are used for exciting the balanced antenna 31, the symmetrical planes/portions of the balanced antenna 31 are equivalent to the magnetic walls, and the first antenna portion 2*a* and the second antenna portion 2*b* are equivalent to be electrically disconnected from each other or equivalent to that the first antenna portion 2*a* is electrically disconnected from the second antenna portion 2*b* at the antenna connection portion 31*c*, so that the inhibition capability of the balanced antenna 31 on the common-mode signals in a differential-mode passband can be improved, an internal grounding structure of the balanced antenna 31 can be omitted, and the manufacture difficulty can be reduced.

In some embodiments, the base substrate 2 further includes a second substrate 22 which is disposed on the first substrate 21 and located on a side of the first substrate 21 proximal to the waveguide back cavity 12. The conversion module 3 is disposed between the first substrate 21 and the second substrate 22. That is, the waveguide transmission cavity 11, the first substrate 21, the conversion module 3, the second substrate 22 and the waveguide back cavity 12 are stacked in sequence.

In the embodiment of the present disclosure, the conversion module 3 is disposed between the first substrate 21 and the second substrate 22. Both of the first substrate 21 and the waveguide transmission cavity 11 may constrain the transmission of the electromagnetic waves to the balanced antenna 31, and both of the second substrate 22 and the waveguide back cavity 12 may reduce the loss of the electromagnetic waves.

In some embodiments, the balanced antenna 31 is a monopole antenna or a half-wave dipole antenna. The monopole antenna and the half-wave dipole antenna have a flexible design, a wide application range, and a suitability for various kinds of waveguides.

When the balanced antenna 31 is a monopole antenna, the waveguide conversion device 3 further includes a ground plate 34 which is virtually grounded and disposed on a surface of the second substrate 22 proximal to the waveguide back cavity 12. The width of the ground plate 34 is smaller than or equal to the widths of the first substrate 21 and the second substrate 22, and the length of the ground plate 34 is smaller than the lengths of the first substrate 21 and the second substrate 22. The ground plate 34 may be disposed outside the waveguide back cavity 12, or a portion of the ground plate 34 may extend into the waveguide cavity 1 as long as the waveguide propagation is not affected by the ground plate 34.

It should be noted that, in the waveguide conversion device shown in FIG. 7, except for the shapes of the waveguide transmission cavity 11 and the waveguide back cavity 12 are different from those of the waveguide transmission cavity 11 and the waveguide back cavity 12 in FIG. 1, FIG. 4 to FIG. 6, other structures of the waveguide conversion device are the same as those of the waveguide conversion device in FIG. 1, and FIG. 4 to FIG. 6, and details thereof will be omitted herein.

Figure 8:
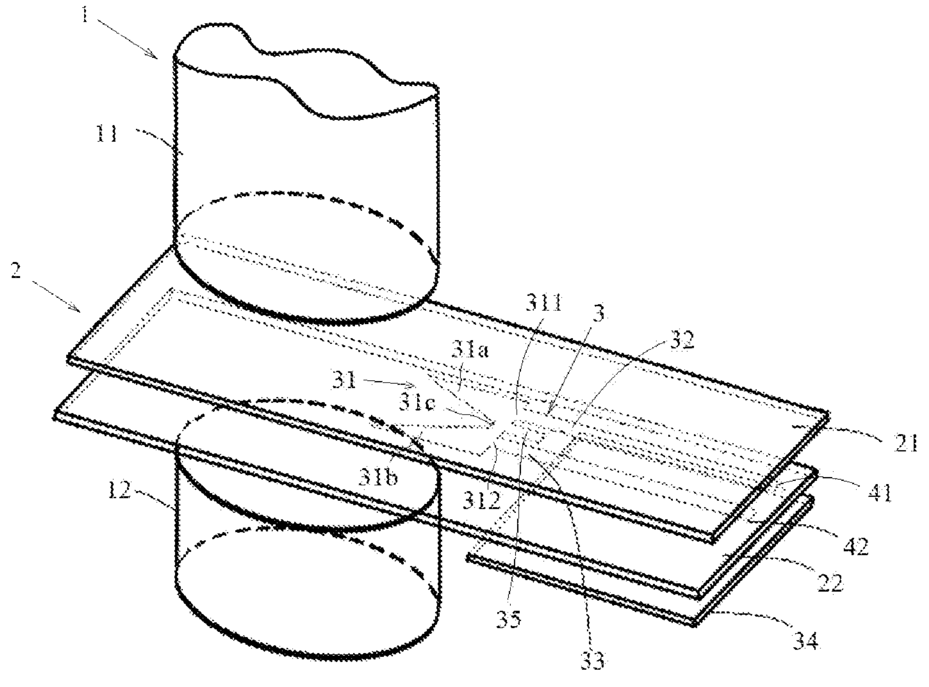
FIG. 8 is a schematic diagram showing a structure of another waveguide conversion device according to an embodiment of the present disclosure.

FIG. 8 is a schematic diagram showing a structure of another waveguide conversion device according to an embodiment of the present disclosure. As shown in FIG. 8, the waveguide conversion device includes a waveguide cavity 1, a base substrate 2, and a conversion module 3.

The waveguide cavity 1 may constrain the transmission direction of the electromagnetic waves. The waveguide cavity 1 includes a waveguide transmission cavity 11 and a waveguide back cavity 12 which are opposite to or face each other, and a region where the waveguide transmission cavity 11 is opposite to or faces the waveguide back cavity 12 is a feed port.

In some embodiments, the waveguide cavity 1 is a circular waveguide cavity, that is, both of the waveguide transmission cavity 11 and the waveguide back cavity 12 have circular structures. At a same frequency, the circular waveguide has smaller loss, which is beneficial to improving the performance of the wireless communication system.

In some embodiments, a height of the waveguide back cavity 12 is a quarter of the wavelength of the waveguide, that is, the height of the waveguide back cavity 12 is λ/4, where λ is the wavelength of the waveguide, thereby increasing the coupling efficiency of the waveguide, increasing the transmission efficiency of the waveguide, and improving the resonant frequency and the bandwidth.

It should be noted that, although no ridge structures are disposed in the waveguide transmission cavity 11 of the waveguide conversion device shown in FIG. 8, it does not mean that the ridge structure may not be formed in the waveguide transmission cavity 11 of the waveguide conversion device. No waveguide ridge is disposed in the waveguide back cavity 12, but it does not mean that the waveguide ridge may not be formed in the waveguide back cavity 12 of the waveguide conversion device.

In the embodiment, the base substrate 2 is disposed between the waveguide transmission cavity 11 and the waveguide back cavity 12, that is, the waveguide transmission cavity 11, the substrate 2, and the waveguide back cavity 12 are stacked in sequence.

In some embodiments, the base substrate 2 includes at least a first substrate 21. Both of the waveguide transmission cavity 11 and the first substrate 21 may constrain the electromagnetic waves near the conversion module 3 as much as possible, thereby improving the coupling efficiency of the waveguide.

In the embodiment, the conversion module 3 is disposed on the first substrate 21, that is, the conversion module 3 is carried on the first substrate 21. The conversion from the mode of the waveguide to the mode of the microstrip differential lines can be realized by the conversion module 3.

In some embodiments, the conversion module 3 includes a balanced antenna 31, a first differential strip-line 32, and a second differential strip-line 33. The balanced antenna 31 is disposed in a region where the waveguide transmission cavity 11 is opposite to or faces the waveguide back cavity 12, that is, the balanced antenna 31 is disposed in a region corresponding to the feed port. The balanced antenna 31 includes a first output port 311 and a second output port 312 for outputting differential signals. One end of the first differential strip-line 32 is connected to the first output port 311 of the balanced antenna 31, and the other end of the first differential strip-line 32 is connected to the first microstrip differential line 41. That is, the first output port 311 of the balanced antenna 31 is connected to the first microstrip differential line 41 via the first differential strip-line 32. One end of the second differential strip-line 33 is connected to the second output port 312 of the balanced antenna 31, and the other end of the second differential strip-line 33 is connected to the second microstrip differential line 42. That is, the second output port 312 of the balanced antenna 31 is connected to the second microstrip differential line 42 via the second differential strip-line 33.

In some embodiments, the balanced antenna 31 includes a first antenna portion 31*a* and a second antenna portion 31*b* symmetrical to each other. The first antenna portion 31*a* is connected to the second antenna portion 31*b* via an antenna connection portion 31*c*. The first output port 311 is disposed on the first antenna portion 31*a*, and the second output port 312 is disposed on the second antenna portion 31*b*.

In some embodiments, each of orthographic projections of the first antenna portion 31*a* and the second antenna portion 31*b* on the first substrate 21 has a right triangle shape, and an acute angle portion of the first antenna portion 31*a* is connected to an acute angle portion of the second antenna portion 31*b* via the antenna connection portion 31*c*.

In the embodiment of the present disclosure, the balanced antenna 31 is a planar antenna, and is formed by connecting the first antenna portion 31*a* to the second antenna portion 31*b* that are symmetrical to each other. In order to couple the fundamental mode of the waveguide tightly, the direction of insertion of the balanced antenna 31 into the waveguide cavity 1 may be adjusted according to the characteristics of the distribution of the magnetic fields of the waveguide and the balanced antenna 31.

For example, when the waveguide cavity 1 is a rectangular waveguide cavity, the balanced antenna 31 is inserted into the rectangular waveguide cavity 1 from a narrow side of the rectangular waveguide cavity, so that the electric field generated by the balanced antenna 31 coincides in mode with the electric field of the fundamental mode of the waveguide, thereby exciting the fundamental mode of the waveguide.

In the embodiment of the present disclosure, the waveguide is coupled to the first differential strip-line 32 and the second differential strip-line 33 via the balanced antenna 31, so that the mode matching between the balanced antenna 31 and the first microstrip differential line 41 and the second microstrip differential line 42 can be achieved.

In some embodiments, the conversion module 3 further includes a balanced branch 35 which is connected to the antenna connection portion 31*c* and located between the first differential strip-line 32 and the second differential strip-line 33.

The balanced branch 35 has a portion overlapping the ground plate 34, that is, a portion of the balanced branch 35 is in a region where the waveguide transmission cavity 11 overlaps or faces the waveguide back cavity 12, and the remaining portion of the balanced branch 35 is outside the region where the waveguide transmission cavity 11 overlaps or faces the waveguide back cavity 12. According to the odd-even mode theory, when differential-mode signals are used for exciting the balanced antenna 31, the symmetrical planes/portions of the balanced antenna 31 are equivalent to the electrical walls, and the first antenna portion 2*a* and the second antenna portion 2*b* are equivalent to that the first antenna portion 2*a* and the second antenna portion 2*b* are short-circuited and grounded. When common-mode signals are used for exciting the balanced antenna 31, the symmetrical planes/portions of the balanced antenna 31 are equivalent to the magnetic walls, and the first antenna portion 2*a* and the second antenna portion 2*b* are equivalent to be electrically disconnected from each other or equivalent to that the first antenna portion 2*a* is electrically disconnected from the second antenna portion 2*b* at the antenna connection portion 31*c*, so that the inhibition capability of the balanced antenna 31 on the common-mode signals in a differential-mode passband can be improved, an internal grounding structure of the balanced antenna 31 can be omitted, and the manufacture difficulty can be reduced.

In some embodiments, the base substrate 2 further includes a second substrate 22 disposed on the first substrate 21 and on a side of the first substrate 21 proximal to the waveguide back cavity 12. The conversion module 3 is disposed between the first substrate 21 and the second substrate 22. That is, the waveguide transmission cavity 11, the first substrate 21, the conversion module 3, the second substrate 22 and the waveguide back cavity 12 are stacked in sequence.

In the embodiment of the present disclosure, the conversion module 3 is disposed between the first substrate 21 and the second substrate 22. Both of the first substrate 21 and the waveguide transmission cavity 11 may constrain the transmission of the electromagnetic waves to the balanced antenna 31, and both of the second substrate 22 and the waveguide back cavity 12 may reduce the loss of the electromagnetic waves.

In some embodiments, the balanced antenna 31 is a monopole antenna or a half-wave dipole antenna.

When the balanced antenna 31 is a monopole antenna, the waveguide conversion device 3 further includes a ground plate 34 which is grounded or virtually grounded. The ground plate 34 is disposed on a surface of the second substrate 22 proximal to the waveguide back cavity 12. A width of the ground plate 34 is the same as widths of the first substrate 21 and the second substrate 22, and a length of the ground plate 34 is smaller than lengths of the first substrate 21 and the second substrate 22. The ground plate 34 is disposed outside the waveguide back cavity 12, that is, the ground plate 34 is not inserted between the waveguide transmission cavity 11 and the waveguide back cavity 12.

It should be noted that, except that both of the waveguide transmission cavity 11 and the waveguide back cavity 12 of the waveguide conversion device shown in FIG. 8 have a circular shape, other structures of the waveguide conversion device are the same as those of the waveguide conversion device in FIG. 1, and FIG. 4 to FIG. 6, and details thereof will be omitted herein.

In some embodiments, the waveguide cavity includes any one of a rectangular waveguide cavity, a circular waveguide cavity, an elliptical waveguide cavity, and a ridge waveguide cavity.

It should be noted that, in the above embodiments, only one conversion module is provided in the waveguide conversion device, which does not represent a limitation on the number of conversion modules. Two or more conversion modules may be provided in the waveguide conversion device in the embodiments of the present disclosure. The two or more conversion modules may be disposed spacing apart from each other, crossing each other, or overlapping each other.

Figure 9:
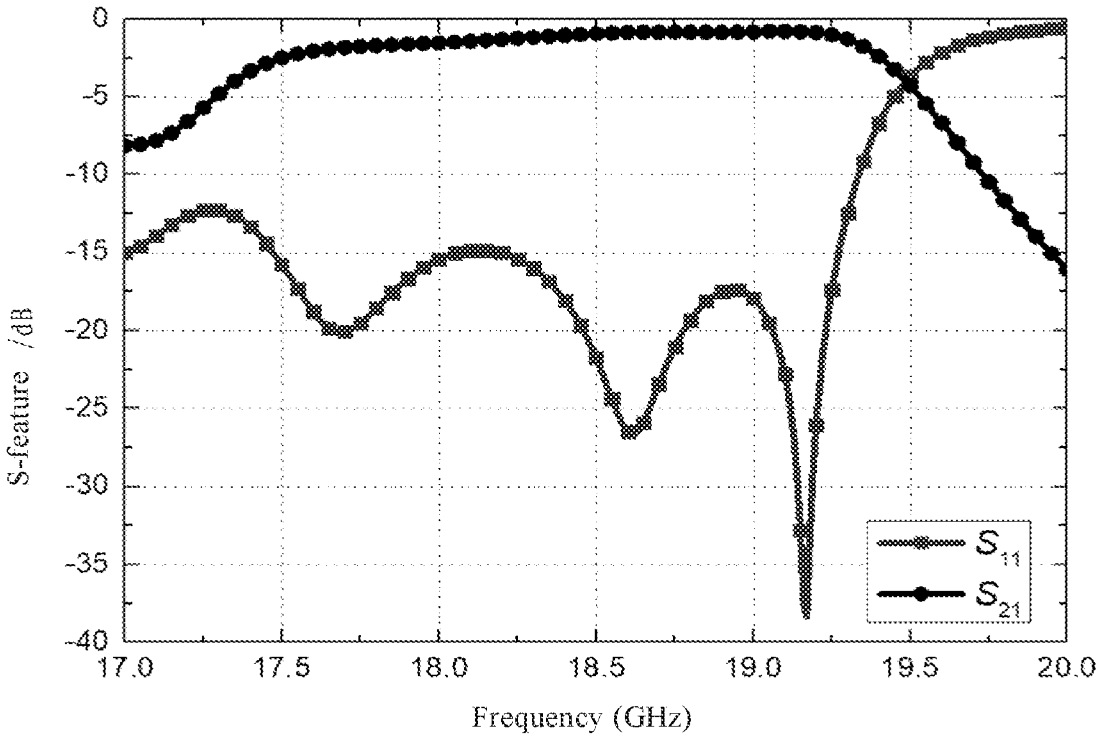
FIG. 9 is a simulation effect diagram of an S-feature of a waveguide conversion device according to an embodiment of the present disclosure.

FIG. 9 is a simulation effect diagram of the S-feature of the waveguide conversion device according to an embodiment of the present disclosure. The abscissa represents frequency in GHz, and the ordinate represents the loss value in dB. As can be seen from FIG. 9, the return loss (S11) is less in the frequency range from 17 GHz to 19.3 GHz, and the insertion loss (S21) is in a range from −15 dB to −25 dB.

An embodiment of the present disclosure further provides a wireless communication system, which includes the waveguide conversion device in any one of the embodiments of the present disclosure, so that impedance matching and mode matching can be realized, and low loss in a wider range of the frequency band can be realized.

It should be noted that, in the present disclosure, the terms "include" "comprise" or any other variation thereof, are intended to cover a non-exclusive inclusion, such that a process, method, article, or apparatus that comprises a list of elements does not include only those elements but may include other elements not expressly listed or inherent to such process, method, article, or apparatus. Without further limitation, an element identified by the phrase "comprising an . . . " does not exclude the presence of other identical elements in the process, method, article, or apparatus that comprises the element.

It is to be understood that the above embodiments are merely exemplary embodiments adopted to illustrate the principles of the present disclosure/utility model, but the present disclosure/utility model is not limited thereto. It will be apparent to those skilled in the art that various modifications and improvements can be made without departing from the spirit and essence of the present disclosure/utility model, and such modifications and improvements are also considered to be within the scope of the present disclosure/utility model.

What is claimed is:

1. A waveguide conversion device, comprising:

a waveguide cavity comprising a waveguide transmission cavity and a waveguide back cavity facing each other;

a base substrate between the waveguide transmission cavity and the waveguide back cavity, the base substrate comprising at least a first substrate; and a conversion module on the first substrate and comprising a balanced antenna, a first differential strip-line and a second differential strip-line, wherein the balanced antenna is in a region where the waveguide transmission cavity faces the waveguide back cavity, the balanced antenna comprises a first output port and a second output port; a first end of the first differential strip-line is connected to the first output port of the balanced antenna, and a first end of the second differential strip-line is connected to the second output port of the balanced antenna.

2. The waveguide conversion device according to claim 1, wherein the balanced antenna comprises a first antenna portion and a second antenna portion symmetrical to each other, the first antenna portion being connected to the second antenna portion via an antenna connection portion, and the first output port is disposed on the first antenna portion, and the second output port is disposed on the second antenna portion.

3. The waveguide conversion device according to claim 2, wherein each of orthographic projections of the first antenna portion and the second antenna portion on the first substrate has a right triangle shape, and an acute angle portion of the first antenna portion is connected to an acute angle portion of the second antenna portion via the antenna connection portion.

4. The waveguide conversion device according to claim 1, wherein the conversion module further comprises a balanced branch connected to the antenna connection portion and located between the first and second differential strip-lines.

5. The waveguide conversion device according to claim 1, wherein the base substrate further comprises a second substrate disposed on the first substrate and located on a side of the first substrate proximal to the waveguide back cavity, and the conversion module is between the first substrate and the second substrate.

6. The waveguide conversion device according to claim 5, wherein the balanced antenna comprises a monopole antenna or a dipole antenna.

7. The waveguide conversion device according to claim 1, further comprising a ground plate disposed on a side of the second substrate proximal to the waveguide back cavity.

8. The waveguide conversion device according to claim 1, wherein a second end of the first differential strip-line is connected to a first microstrip differential line, and a second end of the second differential strip-line is connected to a second microstrip differential line.

9. The waveguide conversion device according to claim 1, wherein a waveguide ridge is disposed on a bottom of the waveguide back cavity.

10. The waveguide conversion device according to claim 1, wherein one ridge structure or a plurality of ridge structures stacked in sequence are disposed in the waveguide transmission cavity.

11. The waveguide conversion device according to claim 1, wherein the waveguide cavity comprises any one of a rectangular waveguide cavity, a circular waveguide cavity, an elliptical waveguide cavity, and a ridge waveguide cavity.

12. A wireless communication system comprising a waveguide conversion device which is the waveguide conversion device according to claim 1.

13. The waveguide conversion device according to claim 2, wherein each of orthographic projections of the first antenna portion and the second antenna portion on the first substrate has an isosceles triangle shape or equilateral triangle shape, and a vertex angle portion of the first antenna portion is connected to a vertex angle portion of the second antenna portion via the antenna connection portion.

14. The waveguide conversion device according to claim 2, wherein each of orthographic projections of the first antenna portion and the second antenna portion on the first substrate has a rectangular shape, and a short side of the first antenna portion is connected to a short side of the second antenna portion via the antenna connection portion.

15. The waveguide conversion device according to claim 1, further comprising a ground plate on a side of the first substrate proximal to the waveguide transmission cavity.

16. The waveguide conversion device according to claim 1, further comprising a ground plate between the first substrate and the second substrate.

17. A waveguide conversion device, comprising:

a waveguide cavity comprising a waveguide transmission cavity and a waveguide back cavity facing each other;

a base substrate between the waveguide transmission cavity and the waveguide back cavity, the base substrate comprising a first substrate and a second substrate on a side of the first substrate proximal to the waveguide back cavity, a ground plate on a side of the second substrate proximal to the waveguide back cavity, a conversion module between the first substrate and the second substrate and comprising a balanced antenna, a first differential strip-line and a second differential strip-line, wherein the balanced antenna is in a region where the waveguide transmission cavity faces the waveguide back cavity, the balanced antenna comprises a first output port and a second output port; a first end of the first differential strip-line is connected to the first output port of the balanced antenna, and a first end of the second differential strip-line is connected to the second output port of the balanced antenna, wherein a waveguide ridge is disposed on a bottom of the waveguide back cavity, and a plurality of ridge structures stacked in sequence are disposed in the waveguide transmission cavity.

* * * * *